Aug. 27, 1957  D. V. TUTTLE  2,804,535
MAGNETIC HEATER UNIT
Filed June 14, 1954
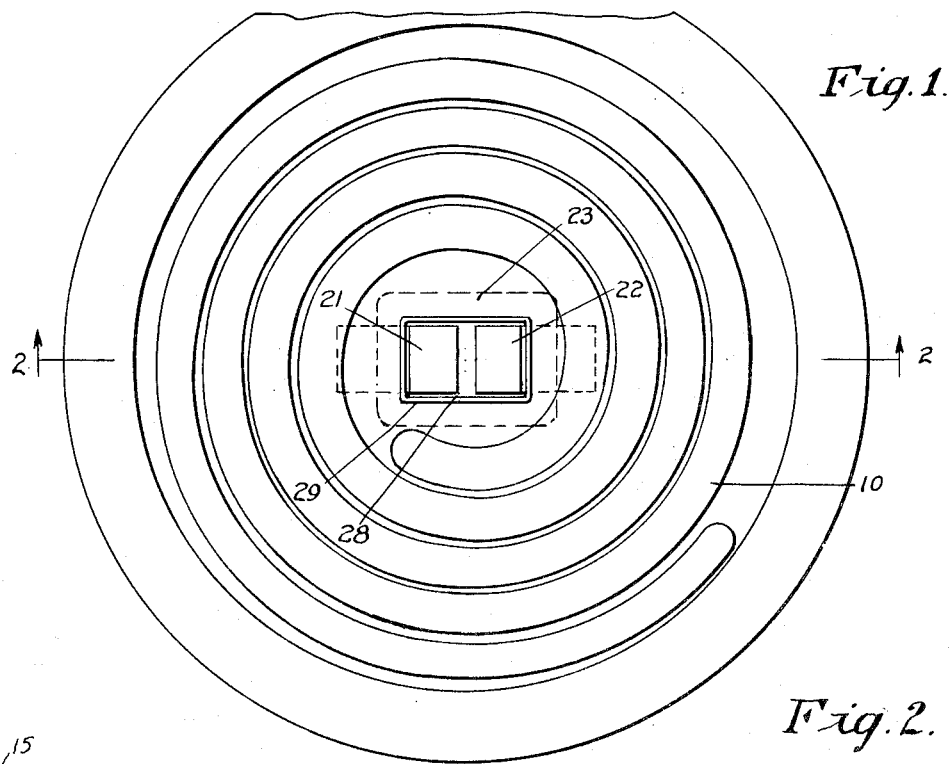
Fig. 1.
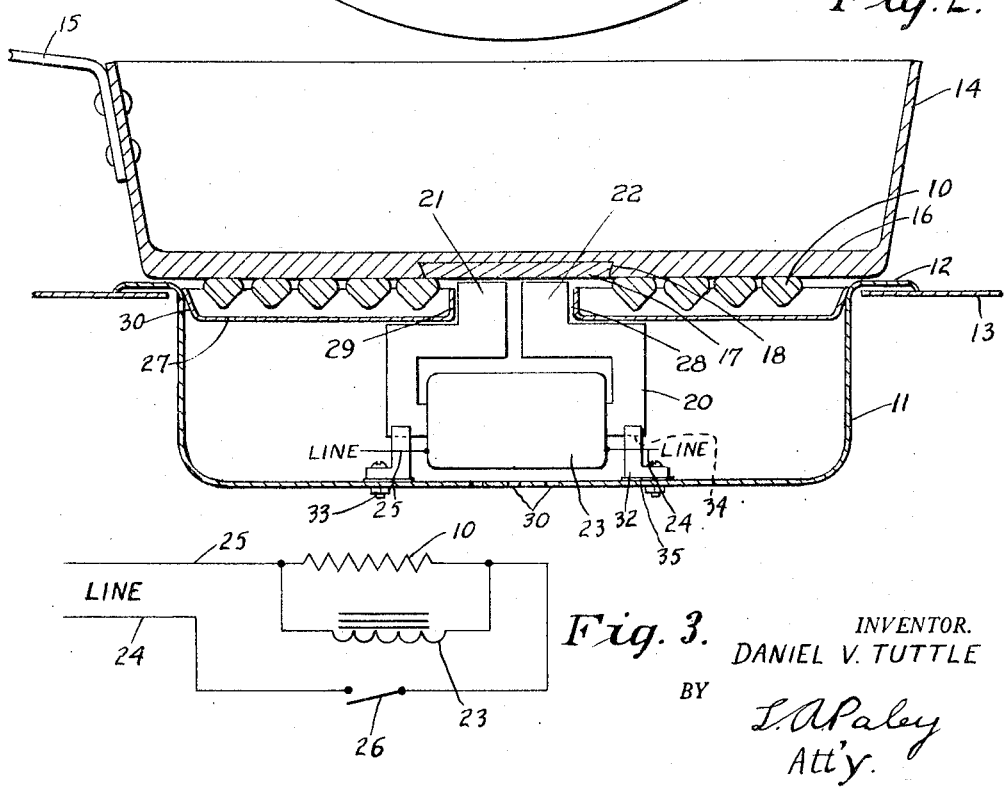
Fig. 2.
Fig. 3.
INVENTOR.
DANIEL V. TUTTLE
BY
L. A. Paley
Att'y.

United States Patent Office 2,804,535
Patented Aug. 27, 1957

2,804,535

MAGNETIC HEATER UNIT

Daniel V. Tuttle, Kirkland, Ill., assignor, by mesne assignments, to Tuttle & Kift, Inc., Chicago, Ill., a corporation of Illinois Application June 14, 1954, Serial No. 436,292

8 Claims. (Cl. 219—43)

This invention relates to cooking devices, and has reference more particularly to magnet means for attracting a magnetic cooking vessel tightly against an electric heating element.

In the cooking art, the use of electric cooking ranges, hot plates, heating elements and the like, has become standard practice. It has been found that cooking vessels often do not set tightly against the heating element. This may be caused by the weight of a handle extending from one side of the cooking vessel, which tends to tip the vessel up on one edge adjacent the handle. If the vessel does not set tightly against the heating element, a loss in efficiency results, the heating time is prolonged, and considerable heat from the heating element is wasted. I have found by the use of my magnet device, a marked increase in speed of heating the contents of a cooking vessel results, due to the fact that the vessel is pressed tightly against the heat element by a magnet device. Children have been known to pull a boiling pot onto themselves from the stove and get badly burned and my magnet device prevents this difficulty.

An object of the invention therefore, is to provide a non-magnetic metal cooking vessel with a magnetic metal insert in the bottom thereof, for attraction by a magnet tightly against an electric heating element.

Another object of the invention is to provide a combination heating element and magnet to pull a cooking vessel tightly against the heating element by magnetic attraction.

A further object of the invention is to increase the speed and improve the efficiency of electric cooking by magnetically pulling a cooking vessel tightly against an electric heating element.

A further object of the invention is to provide a magnet to prevent a pot from being pulled from a stove by a child to prevent burns.

A still further object of the invention is to provide an electric circuit containing a heating element and electro magnet to be energized simultaneously by a switch; also to improve cooking devices in other respects hereinafter specified and claimed.

Reference is to be had to the accompanying drawing forming a part of this specification, in which:

Fig. 1 is a plan view of an electric cooking burner or element in combination with a magnet, Fig. 2 is a sectional view through the device taken on line 2—2 of Fig. 1, and Fig. 3 is a wiring diagram of the device.

Referring to the drawings by numerals, a heating element 10 is in the form of a flat spiral and is commonly formed of resistance wire sheathed with ferrous metal. A basin 11 below the element 10 has an outstanding annular flange 12 which is supported on the top 13 of an electric range or other cooking or heating unit. A cooking vessel 14, such as an iron frying pan, or other magnetic cooking utensil, is supported on the element 10, said vessel often having an outsanding handle 15, which has a tendency to tip the vessel partly on edge so that an air space exists between the bottom 16 of vessel 14, and the element 10. If the vessel 14 is of a non-magnetic metal, such as aluminum, I provide a magnetic insert 17 of iron or other magnetic material, said insert having sloping edge 18 and being cast directly into the bottom 16. The sloping edge 18 gives a firm bond with the bottom 16 of non-magnetic metal.

A magnet core 20 which is preferably laminated, is positioned with its two poles 21 and 22 directly below the vessel bottom 16 and a wire coil 23 is wound around the core 20. Leads 24 and 25 extend from the coil 23 and form an electrical circuit in which the element 10 is included in parallel with the electro magnet coil 23. A switch 26 is included in the circuit so that when said switch is closed, the coil 23 and element 10 are simultaneously energized. A baffle 27 has a central opening 28 bounded by an upstanding flange 29 fitting loosely around the poles 21 and 22. A sloping flange 30 is formed around the outer periphery of baffle 27 to fit the inside of basin 11. Baffle 27 protects the coil 23 from the heat of the element 10.

A pair of angle brackets 32 of non-magnetic material, such as brass, are attached to basin 11 by bolts 33. A notch 34 is provided in the top of each bracket 32 to receive the electro magnet 20. A shim 35 is provided below each bracket 32 so that the distance between the magnet poles 21 and 22 and vessel 14 can be adjusted by changing shims. The element 10 and baffle 27 can be removed for cleaning ventilating holes 30 may be provided in basin 11 to cool coil 23.

The action of the electro magnet is to pull the vessel 14 down tightly against the element 10 to shorten heating time and improve the efficiency of electricity use. Children cannot get burnt by pulling a boiling pot from the stove onto themselves. A permanent magnet may be used instead of electro magnet. Alternating current may be used for the electro-magnet, or the alternating current may be rectified to direct current by a suitable rectifier, and the direct current used.

I would state in conclusion that, while the example illustrated constitutes a practical embodiment of my invention, I do not wish to limit myself precisely to these details, since manifestly the same may be considerably varied without departing from the spirit of the invention as defined in the appended claims.

Having thus described my invention, I claim as new and desire to secure by Letters Patent:

1. A cooking heater of the class described for magnetically holding a cooking container thereon, which said cooking heater comprises an electric heating unit having a central opening around which the heating unit is distributively arranged to provide a flat surface whereon the cooking container is supported, a horizontal panel by which the heating unit is supported and having an opening therethrough in which the heating unit is located, a mounting member which is supported by the panel and projects downwardly through said opening of the panel and has a part thereof underlying the said panel opening at a distance therebelow, and a magnet mounted on said underlying part of the mounting member and having a pole portion thereof projecting upwardly through the aforesaid central opening of the heating unit and terminating approximately at the level of the aforesaid flat surface of the heating unit whereon the cooking container is supported.

2. A cooking heater of the class described for magnetically holding a cooking container thereon, which said cooking heater comprises an electric heating unit having a central opening around which the heating unit is distributively arranged to provide a flat surface whereon the cooking container is supported, a horizontal panel by which the heating unit is supported and having an opening therethrough in which the heating unit is located, a pan which is supported by the panel and projects downwardly through said opening of the panel and has a rim around the top thereof overlying and resting on the marginal portion of the panel around the panel opening and said pan having the bottom thereof located at a distance below the panel opening and the heating unit therein, and a magnet mounted on the bottom of said pan and having a pole portion thereof projecting upwardly through the aforesaid central opening of the heating unit and terminating approximately at the level of the aforesaid flat surface of the heating unit whereon the cooking container is supported.

3. A cooking heater of the class described for magnetically holding a cooking container thereon, which said cooking heater comprises an electric heating unit having a central opening around which the heating unit is distributively arranged to provide a flat surface whereon the cooking container is supported, a horizontal panel by which the heating unit is supported and having an opening therethrough in which the heating unit is located, a pan which is supported by the panel and projects downwardly through said opening of the panel and has a rim around the top thereof overlying and resting on the marginal portion of the panel around the panel opening and said pan having the bottom thereof located at a distance below the panel opening and the heating unit therein, and a magnet mounted on the bottom of said pan and having a pole portion thereof projecting upwardly through the aforesaid central opening of the heating unit and terminating approximately at the level of the aforesaid flat surface of the heating unit whereon the cooking container is supported, the said bottom of the pan having a pair of brackets thereon by which the magnet is supported.

4. A cooking heater of the class described for magnetically holding a cooking container thereon, which said cooking heater comprises an electric heating unit having a central opening around which the heating unit is distributively arranged to provide a flat surface whereon the cooking container is supported, a horizontal panel by which the heating unit is supported and having an opening therethrough in which the heating unit is located, a pan which is supported by the panel and projects downwardly through said opening of the panel and has a rim around the top thereof overlying and resting on the marginal portion of the panel around the panel opening and said pan having the bottom thereof located at a distance below the panel opening and the heating unit therein, and a magnet mounted on the bottom of said pan and having a pole portion thereof projecting upwardly through the aforesaid central opening of the heating unit and terminating approximately at the level of the aforesaid flat surface of the heating unit whereon the cooking container is supported, the said bottom of the pan having supporting means thereon by which the magnet is removably supported.

5. A cooking heater of the class described for magnetically holding a cooking container thereon, which said cooking heater comprises an electric heating unit having a central opening around which the heating unit is distributively arranged to provide a flat surface whereon the cooking container is supported, a horizontal panel by which the heating unit is supported and having an opening therethrough in which the heating unit is located, a mounting member which is supported by the panel and projects downwardly through said opening of the panel and has a part thereof underlying the said panel opening at a distance therebelow, and an electromagnet mounted on said underlying part of the mounting member and having a core with two opposite ends of opposite polarity projecting upwardly through the aforesaid central opening of the heating unit and terminating approximately at the level of the aforesaid flat surface of the heating unit whereon the cooking container is supported.

6. A cooking heater of the class described for magnetically holding a cooking container thereon, which said cooking heater comprises an electric heating unit having a central opening around which the heating unit is distributively arranged to provide a flat surface whereon the cooking container is supported, a horizontal panel by which the heating unit is supported and having an opening therethrough, a relatively deep pan which is supported by the panel and projects downwardly through said opening of the panel and has a rim around the top thereof overlying and resting on the marginal portion of the panel around the panel opening and said pan having the bottom thereof located at a distance below the panel opening, a shallow pan which has the heating unit therein and is mounted in the top of said relatively deep pan at an elevation above the bottom of said relatively deep pan and has a central opening with upwardly extending flange therearound projecting upwardly in the central opening of heating unit, and a magnet which is located between said pans and mounted on the bottom of the relatively deep pan and has at least one pole portion thereof projecting upwardly through the central opening of the shallow pan and terminating approximately at the level of the aforesaid flat surface of the heating unit whereon the cooking container is supported.

7. A cooking heater of the class described for magnetically holding a cooking container thereon, which said cooking heater comprises an electric heating unit having a central opening around which the heating unit is distributively arranged to provide a flat surface whereon the cooking container is supported, a magnet which is mounted underneath the said heating unit and has a pole portion of maximum magnetic concentration projecting upwardly through the aforesaid opening of the heating unit and terminating approximately at the level of the aforesaid flat surface of the heating unit whereon the cooking container is supported, and a cooking container having a flat bottom which is adapted to rest on the aforesaid flat surface of the heating unit and the central portion only of the said flat bottom of said cooking container being capable of responding magnetically to said magnet and the said pole portion of the magnet being cooperable with said central portion of the bottom of the container to induce positioning of the container bottom centrally on the heating unit.

8. A cooking heater of the class described for magnetically holding a cooking container thereon, which said cooking heater comprises an electric heating unit having a central opening around which the heating unit is distributively arranged to provide a flat surface whereon the cooking container is supported, a magnet which is mounted underneath the said heating unit and has a pole portion of maximum magnetic concentration projecting upwardly through the aforesaid opening of the heating unit and terminating approximately at the level of the aforesaid flat surface of the heating unit whereon the cooking container is supported and a cooking container having a flat bottom which is adapted to rest on the aforesaid flat surface of the heating unit and the central portion only of the said flat bottom of said cooking container being magnetically responsive to said magnet and the said pole portion of the magnet being cooperable with said central portion of the bottom of the container to induce positioning of the container bottom centrally on the heating unit, the said magnetically responsive central portion of the container bottom being a disc recessed in the container bottom.

References Cited in the file of this patent

UNITED STATES PATENTS

| | | |
|---|---|---|
| 2,012,981 | Wilsey | Sept. 3, 1935 |
| 2,497,753 | Arnot | Feb. 14, 1950 |
| 2,678,991 | Amfitheatrof | May 18, 1954 |

FOREIGN PATENTS

| | | |
|---|---|---|
| 468,150 | Great Britain | June 30, 1937 |